(12) United States Patent
Zhang et al.

(10) Patent No.: US 11,697,985 B2
(45) Date of Patent: Jul. 11, 2023

(54) AUTOMATED HYDRAULIC FRACTURING OPERATION

(71) Applicant: Caterpillar Inc., Peoria, IL (US)

(72) Inventors: Yanchai Zhang, Dunlap, IL (US); Zhijun Cai, Dunlap, IL (US); Perry Dwain Converse, Lafayette, IN (US); Erik L Olsen, Peoria, IL (US); Casey Alan Otten, Spring, TX (US)

(73) Assignee: Caterpillar Inc., Peoria, IL (US)

(*) Notice: Subject to any disclaimer, the term of this patent is extended or adjusted under 35 U.S.C. 154(b) by 37 days.

(21) Appl. No.: 17/110,415

(22) Filed: Dec. 3, 2020

(65) Prior Publication Data

US 2022/0178235 A1 Jun. 9, 2022

(51) Int. Cl.
*E21B 43/26* (2006.01)
*G06Q 10/0631* (2023.01)
*F04B 47/02* (2006.01)
*E21B 47/00* (2012.01)

(52) U.S. Cl.
CPC .......... *E21B 43/2607* (2020.05); *E21B 47/00* (2013.01); *F04B 47/02* (2013.01); *G06Q 10/06313* (2013.01)

(58) Field of Classification Search
CPC ... E21B 43/2607; E21B 43/26; E21B 41/0092
See application file for complete search history.

(56) References Cited

U.S. PATENT DOCUMENTS

| 6,591,591 | B2 | 7/2003 | Coers et al. |
| 6,954,304 | B2 | 10/2005 | Tanaka et al. |
| 9,507,754 | B2 | 11/2016 | Fox et al. |
| 9,875,459 | B2* | 1/2018 | Altamirano ............ E21B 43/26 |
| 9,970,266 | B2 | 5/2018 | Marx et al. |
| 10,294,742 | B2 | 5/2019 | Lovorn et al. |
| 10,415,562 | B2* | 9/2019 | Kajita ................. E21B 43/2607 |
| 10,657,441 | B2 | 5/2020 | Dursun et al. |
| 11,327,473 | B2* | 5/2022 | Sayyarrodsari .. G05B 19/41865 |

(Continued)

FOREIGN PATENT DOCUMENTS

| CN | 110941890 A | 3/2020 |
| EP | 3187438 A1 | 7/2017 |

*Primary Examiner* — Kenneth L Thompson
(74) *Attorney, Agent, or Firm* — Lee & Hayes, PLLC

(57) ABSTRACT

An automated hydraulic fracturing system and method for controlling various aspects of a fracking operation is disclosed. A master controller receives various operating parameters, such as desired operating conditions, information about a fracking site, information about trailers and/or other equipment at the fracking site, and/or sensor signals. The master controller may access one or more trailer model(s) that model various parameters of equipment (e.g., engines, transmissions, pumps, trailers, etc.) at the fracking site as a function of controlled operating conditions. The master controller uses the trailer models in conjunction with operating parameters to generate control signals that automatically control the various equipment at the fracking site to optimize various desired outcomes, such as reduced operating costs, reduced emissions, reduced idle time, increased efficiency, etc. The control signals are sent to controllers of the individual equipment to control the operations of those equipment and achieve an overall optimized fracking operation.

20 Claims, 9 Drawing Sheets

(56) References Cited

U.S. PATENT DOCUMENTS

| | | |
|---|---|---|
| 2020/0065677 A1 | 2/2020 | Iriarte Lopez et al. |
| 2021/0025383 A1* | 1/2021 | Bodishbaugh ........ F04B 49/007 |
| 2021/0199110 A1* | 7/2021 | Albert ................. E21B 43/2607 |
| 2021/0388703 A1* | 12/2021 | Hunter .................... E21B 43/26 |
| 2021/0396119 A1* | 12/2021 | Yeung ..................... F04B 23/04 |
| 2022/0003229 A1* | 1/2022 | Mu ......................... F04B 17/06 |
| 2022/0112796 A1* | 4/2022 | Jaaskelainen ....... E21B 43/2607 |

\* cited by examiner

AUTOMATED HYDRAULIC FRACTURING OPERATION

TECHNICAL FIELD

The present disclosure relates to hydraulic fracturing systems for extracting oil and gas. More specifically, the present disclosure relates to automated operation of hydraulic fracturing equipment and processes.

BACKGROUND

Hydraulic fracturing, or "fracking," is used for extracting oil and gas from geologic formations, such as shale, using horizontal fluidized drilling. During fracking, high-pressure fluid, such as a slurry with water, proppants, surfactants, and/or other additives, is used to fracture rock to simulate the flow of oil and gas through the rock to increase the volumes of oil or gas that is collected. The systems used to inject the high-pressure fluid, or fracking fluid, includes, among other components, an engine, transmission, and pump, which are often loaded on a trailer. There may be multiple trailers at a well site to inject the fracking fluid into a well head and, often times, the trailers may have different types of engines, transmissions, and/or pumps loaded thereon. Additionally, the engines, transmissions, and/or pumps may have different operating lifetimes, and therefore, different performance profiles along their lifetimes. It is desirable to operate the trailers and the engines, transmissions, and/or pumps thereon in a manner that is efficient, low cost, reduces fracking fluid leaks, efficiently handles any cavitation experienced, reduces the wear and tear on the trailer components, etc.

During fracking, traditionally, an operator monitors various aspects of the fracking operation and controls the engines, transmissions, and/or pumps on the multiple trailers at the fracking site. However, it is difficult for a human operator to consider all the variables present at a fracking site to operate the equipment in an efficient manner. Inefficiencies in operating the equipment at a fracking site may result in greater costs, increase fracking fluid leaks, greater downtime, greater emissions (e.g., carbon dioxide, volatile organic compounds (VOCs), etc.), and/or reduced lifetimes of the equipment.

One mechanism for automated control at a drilling site is described in U.S. Pat. No. 10,294,742 (hereinafter referred to as "the '742 reference"). The '742 reference describes controlling annular pressure for borehole drilling operations based on a pressure predicted by a formation pressure model. The formation pressure model can be updated with sensor-based pressure measurements. However, the system described in '742 reference is directed to drilling boreholes, and not to hydraulic fracturing operations, particularly hydraulic fracturing operations with multiple trailers that are often disparate, requiring independent control. Additionally, the '742 reference involves additional hardware, such as pressure sensors that can lead to additional complexity and cost.

Examples of the present disclosure are directed toward overcoming one or more of the deficiencies noted above.

SUMMARY

In an example of the present disclosure, a system includes a master controller including one or more processors and one or more computer-readable media storing computer-executable instructions that, when executed by the master controller, cause the master controller to determine a site configuration of a fracking site and determine a trailer configuration of at least one trailer disposed at the fracking site, the at least one trailer including a first controller. The computer-executable instructions, when executed by the master controller, cause the master controller to further receive an indication of desired operating conditions, generate, using one or more trailer models and based at least in part on the site configuration, the trailer configuration, and the desired operating conditions, a control signal, and send the control signal to the first controller, the control signal being executable by the first controller to control the at least one trailer.

In another example of the present disclosure, a method includes determining, by a master controller comprising one or more processors, a site configuration of a fracking site and determining, by the master controller, a trailer configuration of at least one trailer disposed at the fracking site, the at least one trailer including a first controller. The method further includes receiving, by the master controller, an indication of desired operating conditions and determining, by the master controller by accessing a fracking datastore, that the site configuration, the trailer configuration, and the desired operating conditions are unique compared to previously used sets of operating parameters. The method still further includes determining, by the master controller using one or more trailer models and based at least in part on the site configuration, the trailer configuration, and the desired operating conditions, a control signal and sending the control signal to the first controller, the control signal executable by the first controller to control the at least one trailer.

In yet another example of the disclosure, a system includes a master controller including one or more processors, the master controller being operably connected to a first controller associated with a first trailer and a second controller associated with a second trailer via a network and one or more computer-readable media storing computer-executable instructions that, when executed by the master controller, cause the master controller to determine a site configuration of a fracking site at which the first trailer and the second trailer are disposed. The computer-executable instructions, when executed by the master controller, cause the master controller to further receive an indication of desired fracking fluid discharge pressure, determine, using at least one trailer model and based at least in part on the site configuration and the desired fracking fluid discharge pressure, a first control signal associated with the first trailer, determine, using the at least one trailer model and based at least in part on the site configuration and the desired fracking fluid discharge pressure, a second control signal associated with the second trailer. The computer-executable instructions, when executed by the master controller, cause the master controller to still further send the first control signal to the first controller via the network, the first control signal being used by the first controller to operate the first trailer and send the second control signal to the second controller via the network, the second control signal being used by the second controller to operate the second trailer.

DETAILED DESCRIPTION

Wherever possible, the same reference numbers will be used throughout the drawings to refer to the same or like parts.

Figure 1:
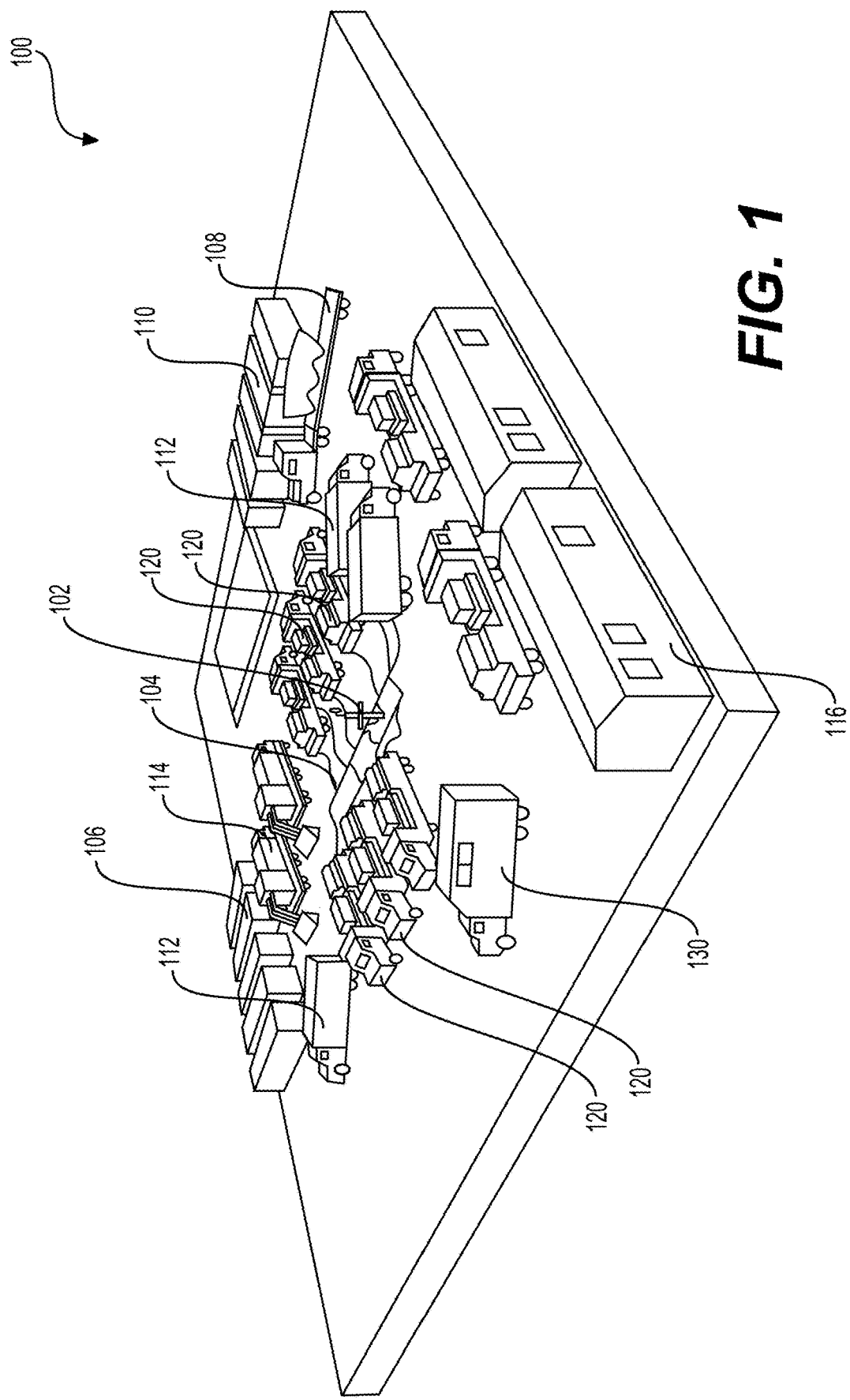
FIG. 1 is a schematic illustration of an example fracking site, in accordance with examples of the disclosure.

FIG. 1 is a schematic illustration of an example fracking site 100, in accordance with examples of the disclosure. The fracking site 100 includes a variety of equipment for performing fracking operations for extracting oil and gas from the ground through wellhead 102. Pressurized fracking fluid is supplied to the wellhead 102 via a variety of pipes 104. Fluid (e.g., water) may be stored on site 100 in fracking fluid tanks 106 and proppants, as delivered by proppant delivery truck(s) 108, provided in the fracking fluid may be stored in proppant storage units 110. Additionally, additives (e.g., surfactants, acids, other chemicals, etc.) of the fracking fluid are stored in chemical storage trucks 112 or chemical tanks. Frack blenders 114 blend the fracking fluid by mixing water, the proppants (e.g., sand, $Al_2O_3$, etc.), and chemicals stored in the chemical storage trucks 112. The fracking site 100 includes shelter 116 for the various personnel who may be working at the fracking site 100.

The fracking fluid, as blended by the frack blenders 114, is injected, at high pressure, through the pipes 104 into the wellhead 102 by one or more trailers 120. The trailers 120, also referred to as fracking rigs, fracking systems, or the like, may have an engine, a transmission, and a pump mounted thereon for pressurizing and injecting the fracking fluid. The engine, transmission, and pumps of the trailers 120 are described in more detail below in conjunction with FIGS. 2 and 3. As depicted, there may be multiple trailers 120 at the fracking site 100. Although six trailers 120 are depicted in FIG. 1, it should be understood that there may be any suitable number of trailers 120 at the fracking site 100, such as, for example seven trailers 120 or two trailers 120. The trailers 120 may have controller(s) thereon and/or integrated with each of the engine, transmission, and pump of each trailer 120 to control the operations of the trailers 120 and their components.

The fracking operations performed at the fracking site 100, and the equipment used in the fracking operations (e.g., each of the trailers 120), may be managed and/or monitored from one or more locations, such as a data monitoring truck 130 and/or the shelters 116. According to examples of the disclosure, the data monitoring truck 130 may include a van, truck, or other vehicle. In some aspects, the data monitoring truck 130 may include a variety of components for monitoring and controlling the fracking operation at the fracking site 100.

Figure 3:
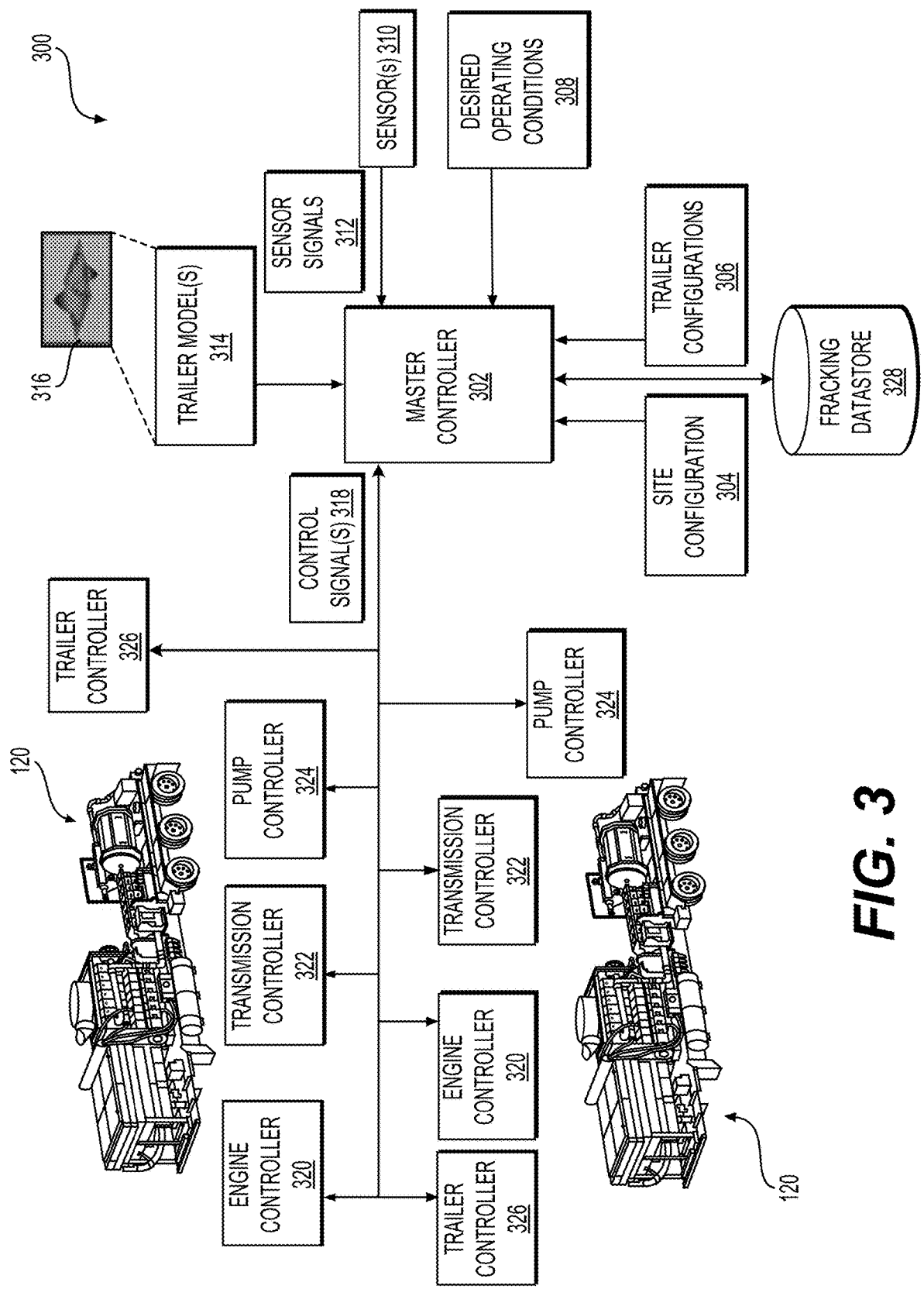
FIG. 3 is a block diagram depicting an example control infrastructure for a master controller controlling the operations of the trailer(s) of FIGS. 1 and 2, according to examples of the disclosure.

The data monitoring truck 130 may include one or more controller(s), such as a master controller, as described further herein, that is configured to receive a variety of inputs associated with the fracking operation at the fracking site 100 and generate control signals that are sent to a variety of controllers on individual ones of the trailers 120, as described in conjunction with FIG. 3. For example, the master controller may receive and/or identify a set of operating conditions, such as desired operating conditions (e.g., pressure, flow rate, etc.) of the fracking operation, configuration of the fracking site 100, configuration of individual trailers 120 of the fracking site 100, and/or one or more sensor signals. The master controller may also access trailer models that model various aspects of the trailers 120, such as the operations of various engines, various transmissions, and/or various pumps.

The master controller, as disposed in the data monitoring truck 130 and/or the shelter(s) 116, may further use the trailer models and the operating conditions to automatically generate control signals, such as control signals that may be used to control the operations of individual ones of the trailers 120. For example, control signals may be generated corresponding to individual ones of the engines, individual ones of the transmissions, and/or individual ones of the pumps at the fracking site 100, as mounted on the trailer(s) 120. In this way, the master controller is configured to control the operations of the fracking operation at the fracking site 100, as will be further discussed herein, such as in conjunction with FIG. 3. According to examples of the disclosure, the master controller may generate the control signals that cause the engines, transmissions, and/or pumps at the fracking site 100 to operate in a manner in which operating costs are minimized, idle time is minimized, wear and tear of equipment is minimized, fuel use is minimized, any combination thereof, or the like. The master controller may send generated control signals to controllers of individual engines, transmissions, and/or pumps at the fracking site 100. In this way, the master controller optimizes the fracking operation across a number of trailers 120 and various equipment for any number of objectives (e.g., minimized costs, maximized efficiency, etc.).

Figure 2:
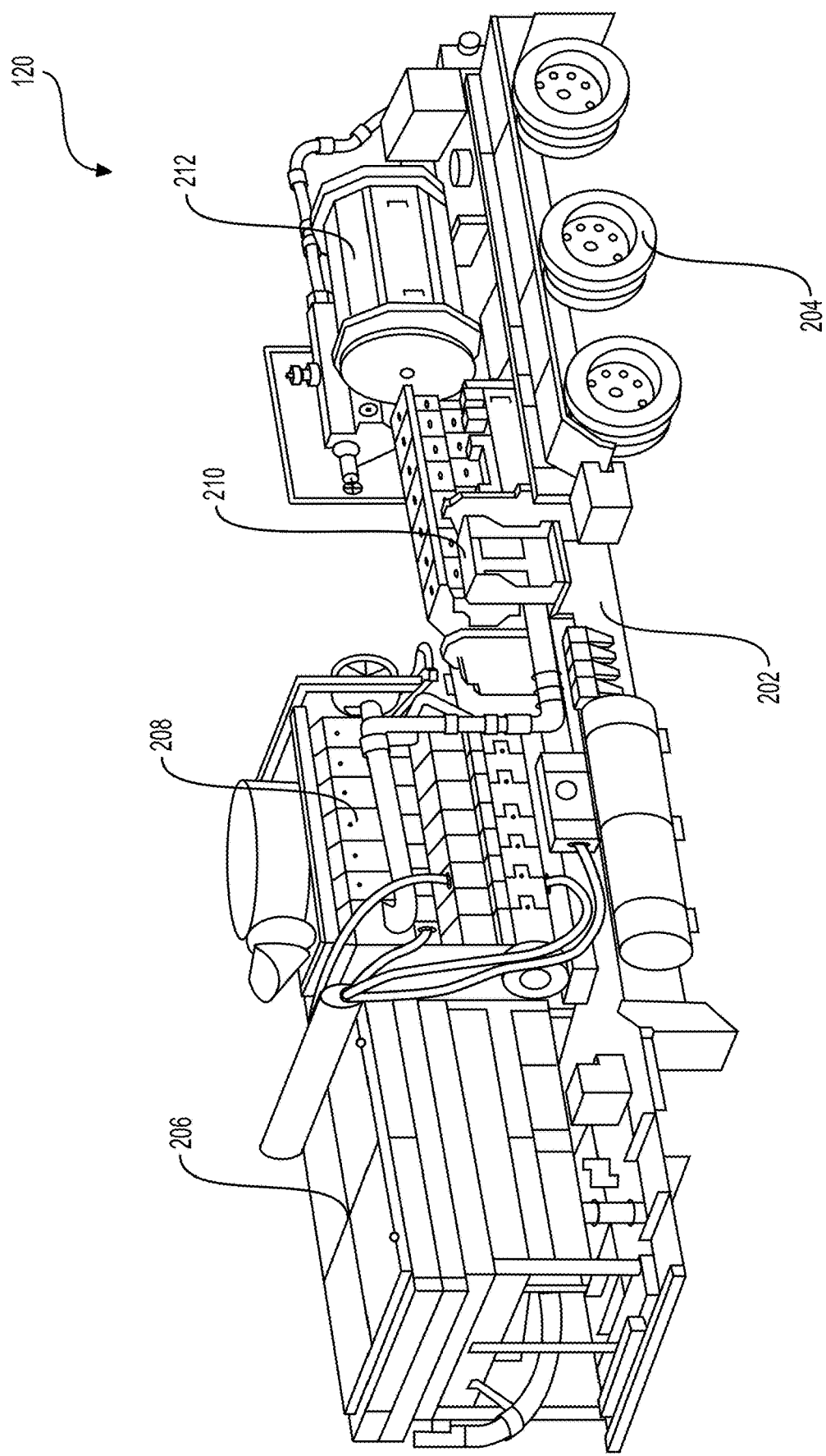
FIG. 2 is a schematic illustration of a trailer that is used for fracking operations at the fracking site of FIG. 1, according to examples of the disclosure.

FIG. 2 is a schematic illustration of a trailer 120 that is used for fracking operations at the fracking site 100 of FIG. 1, according to examples of the disclosure. The trailer 120 includes a frame 202 and wheels 204. The wheels 204 allow the trailer 120 to be mobile and be hauled, such as by attachment to a trailer, to different fracking sites 100 or within a fracking site 100. The wheels 204 may be of any suitable type, such as road compatible wheels with rubber tires. The frame 202 of the trailer 120 may be constructed from any suitable materials, such as iron, steel, aluminum, other metals, ceramics, plastics, the combination thereof, or the like. The frame 202 may be of a unibody construction in some cases, and in other cases, may be constructed by joining two or more separate body pieces. Parts of the frame 202 may be joined by any suitable variety of mechanisms, including, for example, welding, bolts, screws, other fasteners, epoxy, combinations thereof, or the like.

The trailer may include a cooling system 206 that may operationally cool, or otherwise remove thermal energy, from an engine 208, a transmission 210, and/or a pump 212. The cooling system 206 may, for example, pump cooling fluid (e.g., oil, water, transmission fluid, etc.) to individual ones of the engine 208, transmission 210, pump 212, and/or other components of the trailer 120.

The trailer 120 includes the engine 208, which may be of any suitable type, size, power output, age, etc. The engine 208 provides the power to pressurize the fracking fluid that is injected into the wellhead 102 from the trailer 120. In other words, the engine 208 cooperates with the transmission 210 and the pump 212 to pressurize and inject the fracking fluid to enable fracking operations at the fracking site 100.

The engine 208, as described herein, may be of any suitable type, such as an internal combustion engine that uses diesel as fuel. In other cases, the engine 208 may operate using other fuels, such as gasoline, liquified petroleum gas (LPG), liquified natural gas (LNG), compressed natural gas (CNG), kerosene, mixtures thereof, or the like. The engine 208 is mechanically coupled to the transmission 210 using any variety of drive train components, such as a drive shaft. As discussed herein, the engine 208 may be of any suitable power output and/or size. For example, the engine 208 may be a diesel, turbocharge aspirated, aftercooled, 12 cylinder (e.g., V-12) engine with 2500 horsepower (HP) output at 1900 rotations per minute (RPM). It should be understood that the aforementioned specifications are an example and that the engine 208 may be of any suitable size, power output, and/or configuration.

The engine 208 may include an engine controller, as will be discussed herein in conjunction with FIG. 3. The engine controller may be configured to receive control signals from the master controller, as disposed in the data monitoring truck 130 and/or the shelter 116 at the fracking site 100. In this way, the master controller can control the operations of the engine 208, as disposed on the trailer 120. It should further be understood that different trailers 120 at the fracking site 100 may have different engine types (e.g., different makes, models, generations, sizes, power outputs, ages, etc.). The master controller may be configured to control a wide variety of engines 208 at a fracking site 100.

The transmission 210, as mechanically coupled to the engine 208 may be of any suitable type, such as a clutch configuration, a continuous variable transmission (CVT), or the like. For example, the transmission 210 may be a 7-speed automatic transmission with gear ratios ranging from 1 to 6.25, rated at 2500 HP, and with a rated torque output of 7000 pounds-feet (lbs.-ft.). It should be understood that the aforementioned specifications are an example and that the transmission 210 may be of any suitable speeds, torque output, gear ratios, etc.

Similar to the engine 208, the transmission 210 may include a transmission controller, as will be discussed herein in conjunction with FIG. 3. The transmission controller may be configured to receive control signals from the master controller, as disposed in the data monitoring truck 130 and/or the shelter 116 at the fracking site 100. In this way, the master controller can control the operations of the transmission 210, as disposed on the trailer 120. It should further be understood that different trailers 120 at the fracking site 100 may have different transmission types (e.g., different makes, models, generations, speeds, torque outputs, ages, etc.). The master controller may be configured to control a wide variety of transmissions 210 at a fracking site 100.

The pump 212, as mechanically coupled to the transmission 210 may be of any suitable type, such as a reciprocating positive-displacement pump, to inject the proppant (e.g., sand) laden fracking fluid into the wellhead 102. For example, the pump 212 may be a 5 plunger, 3000 HP, 275 RPM pump. It should be understood that the aforementioned specifications are an example and that the pump 212 may be of any suitable configuration, power, etc.

Similar to the engine 208 and the transmission 210, the pump 212 may include a pump controller, as will be discussed herein in conjunction with FIG. 3. The pump controller may be configured to receive control signals from the master controller, as disposed in the data monitoring truck 130 and/or the shelter 116 at the fracking site 100. In this way, the master controller can control the operations of the pump 212, as disposed on the trailer 120. It should further be understood that different trailers 120 at the fracking site 100 may have different pump types (e.g., different makes, models, configurations, power ratings, ages, etc.). The master controller may be configured to control a wide variety of transmissions 210 at a fracking site 100. In some cases, the pump controller may indicate to the master controller, such as by messaging, if a cavitation has occurred and/or the severity of any cavitation (e.g., a three level scale of 1, 2, or 3 indicating the level of cavitation).

According to examples of the disclosure, the engine 208, transmission 210, and/or pump 212 can be automatically controlled by the master controller at the fracking site 100. The master controller may optimize the operations of the engine 208, transmission 210, and/or the pump 212 to achieve one or more objectives, such as reducing the total cost of ownership of the trailer 120, reduce the total emissions from the fracking operations, etc.

In some alternate examples, an electric motor (not shown) may be disposed on the trailer 120, instead of or in addition to the engine 208 and/or the transmission 210. In other words, the electric motor may be powered, such as from a bank of batteries and/or a generator to directly drive the pump 212 or, in some cases, drive the pump 212 via a transmission 210. In these cases where the trailer has an electric motor, rather than the engine 208, a trailer controller may cooperate with the master controller of the fracking site 100 to control the operations of the electric motor, the pump 212, and/or the transmission 210 (in the cases where the electric motor drives a transmission).

FIG. 3 is a block diagram depicting an example control infrastructure for a master controller 302 controlling the operations of the trailer(s) 120 of FIGS. 1 and 2, according to examples of the disclosure. As shown, an environment 300 includes the master controller 302 that may receive a variety of inputs, such as an indication of a site configuration 304 of the fracking site 100, and trailer configurations 306 of the trailers 120 at the fracking site 100. The site configuration 304 may indicate the number of trailers 120 at the fracking site, how the trailers 120 are connected to the pipes 104, the variety of other equipment to be used for the fracking operations, or the like. The trailer configurations 306 may indicate types, ages, configurations, and/or historical performances of the engines 208, the transmission 210, and/or the pumps 212, as mounted on the trailers 120 at the fracking site 100. For example, the master controller 302 may receive, retrieve, and/or solicit information, such as the make and model of the engines 208, the user hours of a particular transmission 210, the stroke efficiency of a particular pump 212 in its last usage, or similar information that can be used to optimize the fracking operations at the fracking site 100.

The master controller 302 may further receive desired operating conditions 308, such as injection pressure and/or flow rate of the fracking fluid into the wellhead 102. The desired operating conditions 308 may be received, retrieved, and/or solicited by the master controller 302 from one or more personnel at the fracking site 100, such as directly via human machine interface(s) (HMIs) and/or via communications with one or more other user devices (e.g., laptop computers, pad computing devices, etc.) at the fracking site 100. For example, a site engineer may input, via a user interface, the desired operating conditions 308, such as the desired flow rate of fracking fluid into the wellhead 102, the output pressure of the fracking fluid into the wellhead 102, and/or any other suitable metric and/or parameter to be controlled as part of the desired operating conditions 308 of the fracking operations. It should further be appreciated that the desired operating conditions 308 may change over time. For example, the fracking operations may start with a high-pressure, low-flow step and then move to a higher-flow step. Such progressions of the desired operating conditions during the fracking operations may be initially provided (e.g., provided a priori) to the master controller 302 and/or provided in a temporally progressive manner, as the fracking operation proceeds.

The master controller 302 may further be configured to receive, from one or more sensor(s) 310, sensor signals 312 that may be processed to determine one or more physical measurements of the fracking operation. For example, temperature sensors (e.g., thermocouple sensors) may be used to measure the temperature of a variety of elements, such as the fracking fluid, the fracking site 100 ambient temperature, the temperature of individual ones of the engine(s) 208, transmissions 210, and/or pumps 212, or the like. As another example, the sensors 310 may include pressure sensors that may provide sensor signals 312 indicative of the fracking fluid inlet pressure, the fracking fluid outlet pressure, the fracking fluid pressure at the outlet of individual ones of the engine(s) 208, transmissions 210, and/or pumps 212, or the like. As yet another example, the sensors 310 may include density sensors, flow rate sensors, and/or fill level sensors that may provide sensor signals 312 indicative of the density, flow rate, and/or fill level of fracking fluid at any suitable location of the fracking site 100.

In some cases, the master controller 302 may receive messages derived from sensor measurements, rather than directly from a sensor 310. In particular, the master controller 302 may receive messages from one or more of trailers 120, engines 208, transmissions 210, and/or pumps 212, where the message may represent a state of the fracking operations. For example, a pump 212 may use sensors to determine that a cavitation has been encountered and provide, to the master controller 302, an indication of the cavitation and/or a magnitude of the cavitation.

The master controller 302 may further receive one or more trailer model(s) 314. These trailer model(s) 314 may provide an indication of the operations of the trailers 120 at the fracking site 100 and/or the operations of individual ones of the engine(s) 208, transmission(s) 210, and/or pumps 212 at the fracking site 100. These trailer model(s) 314 may provide an indication of output parameters of a particular equipment as a function of the control of input parameters. An example of a particular trailer model 314, trailer model 316, as a regression model, shows a particular output parameter as a function of two different controlled parameters. For example, in the context of modeling engine 208 performance, trailer model 316 may model engine efficiency of a particular engine 208 as a function of power output and engine age. As another example, trailer model 316 may model carbon emissions of a particular engine 208 as a function of power output and revolution rate. As yet another example, trailer model 316 may model cost of operation and/or total cost of ownership of a particular engine 208 as a function of power output and runtime.

In the context of modeling a transmission 210, trailer model 316 may model cost of operation of a particular transmission 210 as a function of selected gear and target output torque. As another example, trailer model 316 may model cost of operation of a particular transmission 210 as a function of selected gear and target output torque. As yet another example, the trailer model 316 may model gear based or parasitic loss as a function of gear ratio. Furthermore, in the context of modeling a pump 212, the trailer model 316 may model a mechanical efficiency or parasitic loss of a particular pump as a function of flow rate and output pressure. Indeed, any variety of suitable factors of a particular engine 208, a particular trailer 210, and/or a particular pump 212 may be modeled as a function of any suitable number of controlled variables. In other cases, there may be a single trailer model 314 associated with each trailer 120 at the tracking site 100 that models a performance metric of that trailer 120 as a function of one or more controlled variables. In these cases, the trailer model 314 may represent an aggregate of the characteristics of the engine 208, the transmission 210, and/or the pump 212, as disposed on a particular trailer 120.

Although the trailer models 314 are depicted here as an example trailer model 316 as a two controlled variable regression surface model, the trailer models 314 may be of any suitable type, such as any variety of look-up table, fitting function, machine learning, and/or artificial intelligence models, such as neural network models. Other machine learning model(s) that may be generated and used as the one or more trailer model(s) 314 may include, for example, linear regression models, decision tree models, random forest models, Bayesian network models, any variety of heuristics (e.g., genetic algorithms, swarm algorithms, etc.), combinations thereof, or the like. In some cases, the trailer models 314 may be a combination of different machine learning models. In some examples, the trailer models 314 may change over time based at least in part on the age of the associated engine 208, transmission 210, pump 212, and/or trailer. For example, a trailer model 314 that models the operation of an engine 208 may change as hours of operation of that engine increases over time.

In some cases, the master controller 302 may train the trailer models 314 for deployment and use. Such training of the trailer models 314 may involve collecting training data, such as the efficiency of a particular engine 208 with varying levels of power output of that engine 208. Other training data may include the parasitic losses of a particular transmission 210 at varying gear ratios. Still other examples of training data may include the efficiency of a particular pump 212 at varying levels of flow and/or pressure. The training data may be used to generate the trailer models 314 in a dynamic manner and/or offline. As discussed herein, the trailer models 314 may be generated by the master controller 302 or by any other system configured to execute fitting algorithms, artificial intelligence algorithms, heuristics, and/or machine learning algorithms.

The master controller 302 may be configured to use one or more of the trailer models 314 and the operating parameters, such as the site configuration 304, trailer configurations 306, the desired operating conditions 308, and sensor signals 312 to generate control signals 318. In some cases, these control signals 318 may be generated for individual engines 208, individual transmissions 210, and/or individual pumps 212 at the fracking site 100. In these cases, the control signals 318 corresponding to individual engines 208, transmissions 210, and/or pumps 212 may be provided to respective engine controllers 320, transmission controllers 322, and/or pump controllers 324. The control signals 318 may indicate any suitable operations of the engines 208, such as engine power output, revolutions, throttle control, or the like. Similarly, the control signals 318 may indicate any suitable operations of the transmissions 210, such as transmission speed, gear ratio, or the like. Further still, the control signals 318 may indicate any suitable operations of the pumps 212, such as flow rate, pressure, or the like. The engine controllers 320, the transmission controllers 322, and/or the pump controllers are configured to operate the respective corresponding engines 208, transmissions 210, and/or pumps 212 according to the received control signals 318 from the master controller 302. Thus, in this implementation, the control signals 318 may include engine control signals to control individual engines 208 at the fracking site 100, transmission control signals to control individual transmissions 210 at the fracking site 100, and/or pump control signals to control individual pumps 212 at the fracking site.

In other examples, the control signals 318 may be generated for trailer level control, rather than for individual engine 208, individual transmission 210, and/or individual pump 212 level control. In these cases, the control signals 318 may be sent by the master controller 302 to individual trailer controllers 326 of corresponding trailers 120, rather than the engine controllers 320, the transmission controllers 322, and/or the pump controllers 324 of respective corresponding engines 208, transmissions 210, and/or pumps 212. The control signals 318, in these cases, may indicate any suitable operating conditions at the trailer level, such as flow rate, discharge pressure, or the like from the trailer 120. The trailer controller 326 of a particular trailer 120 may receive the control signals 318, in these implementations, and cooperate with the engine controller 320, transmission controller 322, and/or pump controller 324 of the same trailer 120 to control the trailer 120 according to the received control signals 318. Thus, in this implementation, the control signals 318 may include trailer signals to control individual trailers 120 at the fracking site 100.

In examples where trailers 120 include electric motors instead of an engine 208 and/or a transmission 210, the master controller 302 may instruct the trailer controller 326 with the control signals 318 to control the operations of the corresponding trailer 120. The trailer controller 326, in turn, may control the operations of the electric motor and pump 212 (and, optionally a transmission 210). For example, the master controller 302 may send control signals 318 to the trailer controller 326 of a particular trailer 120 with an electric motor, where the control signals 318 may correspond to a particular pressure, flow rate, and/or any other controllable operating characteristic. The trailer controller 326 may then control the electric motor and the pump 212 to operate to the operating characteristics corresponding to the received control signals 318.

The master controller 302 may be configured to communicate with any or all of the engine controllers 320, transmission controllers 322, pump controllers 324, and/or the trailer controllers 326 at a fracking site 100 using any suitable mechanisms. For example, the master controller may be communicatively coupled with any other controller or other entity at the fracking site 100 using any suitable wired and/or wireless communications links. For example, the master controller 302 may use communications links such as ethernet, WiFi, cellular radio, a wireless (e.g., IEEE 802.1x-based) interface, a Bluetooth® interface, and/or the like.

In some cases, the master controller 302, upon receiving the operating parameters (e.g., site configuration 304, trailer configuration 306, desired operating conditions 308, and/or sensor signals 312) may access a fracking datastore 328 to determine if the operating parameters have been used before. For example, the master controller 302 may determine if the same site configuration 304, trailer configuration 306, and desired operating conditions were used before. If there is a match between the current operating parameters and a set of previously used operating parameters, then the master controller 302, instead of re-optimizing the current fracking operations, may identify control signals 318 that were used before with the same or similar operating parameters. As a result, the master controller 302 does not have to re-optimize every time a new set of operating parameters are to be controlled to, but instead, can leverage prior learning, as stored in the fracking datastore 328. To leverage the past learning, the master controller 302, when determining control signals 318 for a new and unique set of operating parameters, may store those control signals 318 in association with the set of operating parameters in the fracking datastore 328. In this way, that learning may be used in the future when controlling a fracking operation with the same or similar set of operating parameters.

In some examples, the master controller 302 may store and/or access previous learning in a dynamic manner, where operating parameters that are used more frequently may be stored in a more precise manner relative to operating parameters that are less frequently used in fracking operations. Thus, regions of the operating space of a trailer 120 and/or a fracking site 100 that are most frequently used may be mapped with a greater degree of granularity and/or precision than regions of the operating space that are less frequently used. In this way, the most used operating conditions may be precisely defined without expending a relatively high level of storage bandwidth and/or processing bandwidth on less frequently used regions of the operating space.

The master controller 302 may include single or multiple microprocessors, field programmable gate arrays (FPGAs), digital signal processors (DSPs), and/or other components configured to control the fracking operations. Numerous commercially available microprocessors can be configured to perform the functions of the master controller 302. The present disclosure, in any manner, is not restricted to the type of master controller 302 or the positioning depicted of the master controller 302 relative to the fracking site 100.

It should be appreciated that by using the trailer models 314 and the operating parameters (e.g., site configuration 304, trailer configuration 306, desired operating conditions 308, sensor signals 312, and/or any messages from individual engine controllers 320, transmission controllers 322, pump controllers 324, and/or trailer controllers 326), the master controller 302 is able to optimize the fracking operations at a fracking site 100 level for any number of objectives. For example, the objective may be of any suitable type, such as reducing the cost of the fracking operation, reducing emissions from the fracking operation, reducing idle time during the fracking operation, reducing wear on fracking equipment during the fracking operations, increasing efficiency of the fracking operation, reduce an overall time of the fracking operation, reducing the cost of ownership of the equipment used in the fracking operation, any combinations thereof, or the like. In some cases, the master controller 302 may optimize according to one objective, such as minimizing total cost of ownership of the fracking equipment. In other cases, the master controller may optimize according to more than one objective, such as optimizing according to reduced cost of the fracking operation and reduced idle time in the fracking operation. It should further be appreciated that the master controller 302 is able to optimize the fracking operations by considering a wide operating space, as mapped in the trailer models 314, of the equipment. A human operator cannot effectively or practically consider the large number of variables and conditions, in the same manner as the master controller 302. Furthermore, the master controller is able to control the fracking operations of the whole fracking site automatically and without errors and/or idle times that a human operator may bring to the control of the fracking operation, thereby reducing costs and potential errors.

Figure 4:
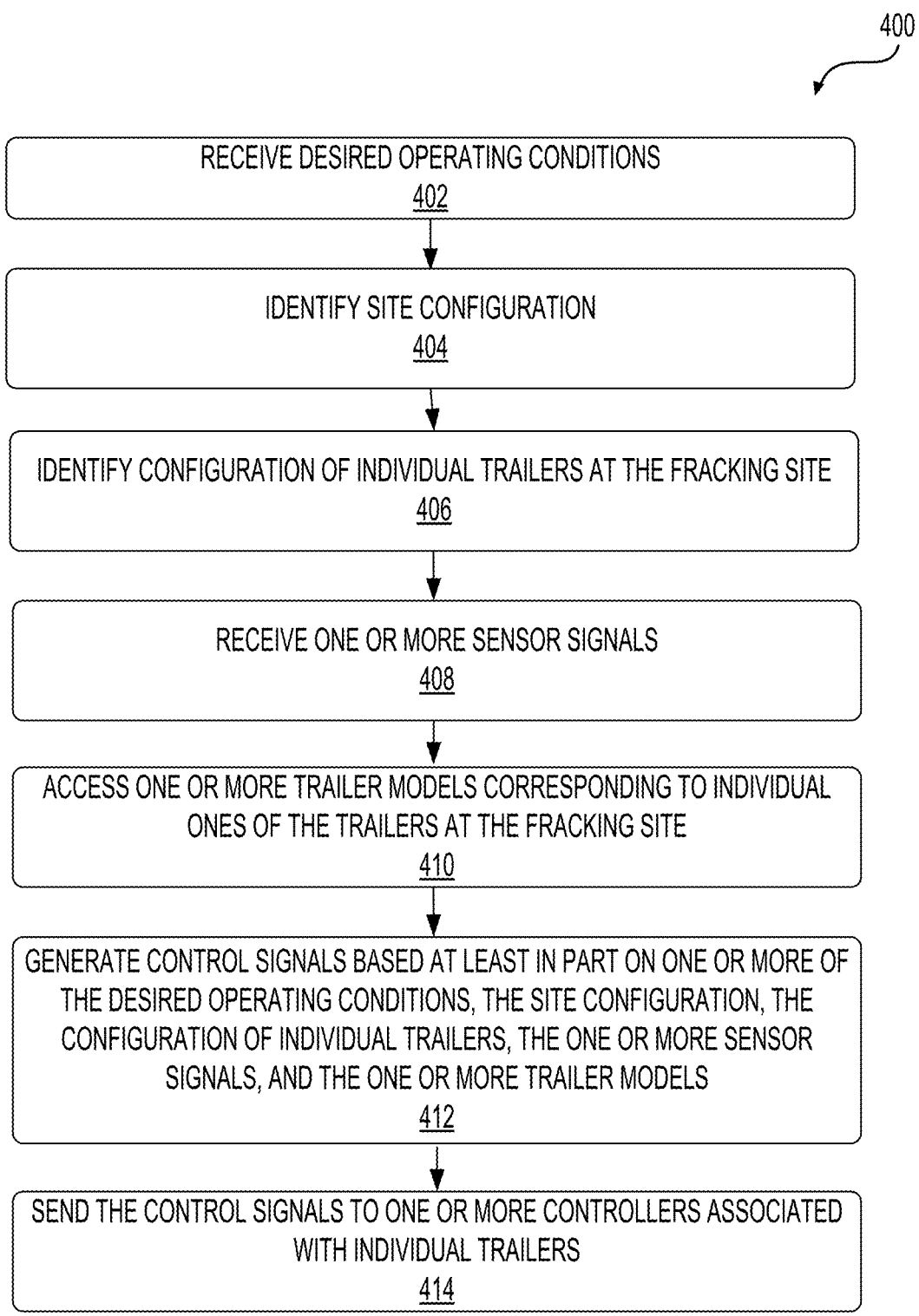
FIG. 4 is a flow diagram depicting an example method for automatically controlling a fracking operation, according to examples of the disclosure.

FIG. 4 is a flow diagram depicting an example method 400 for automatically controlling a fracking operation, according to examples of the disclosure. The processes of method 400 may be performed by the master controller 302, individually or in conjunction with one or more other components of fracking site 100 and/or environment 300.

At block 402, the master controller 302 receives desired operating conditions 308. The master controller 302 may receive these desired operating conditions from any suitable source, such as from an operator interacting directly with an HMI (e.g., mouse keyboard, display, etc.) associated with the master controller 302. Alternatively, the master controller 302 may receive the desired operating conditions by communicating with a client device used by an operator to indicate to the master controller 302 the desired operating conditions 308.

At block 404, the master controller 302 identifies the site configuration 304. In some cases, the master controller 302 may receive the site configuration 304 in a manner similar to how the master controller 302 receives the desired operating conditions 308, such as by HMIs and/or from communicating with a client device. Alternatively, the master controller 302 may automatically receive messages and/or engage in handshaking protocols with individual trailer controllers 326 and/or individual engine controllers 320, individual transmission controllers 322, and/or individual pump controllers 324 to determine and/or catalog the various equipment to be controlled at the fracking site 100.

At block 406, the master controller 302 identifies the configuration of individual trailers 306 at the fracking site 100. The master controller 302 may receive the trailer configurations 306 in a manner similar to how the master controller 302 receives the site configuration 304, such as by HMIs, from communicating with a client device, and/or by communicating directly with individual trailer controllers 326 and/or individual engine controllers 320, individual transmission controllers 322, and/or individual pump controllers 324 to determine and/or catalog the various equipment to be controlled on each trailer 120.

At block 408, the master controller 302 receives one or more sensor signals 312. The master controller 302 may receive the sensor signals 312 from one or more sensor(s) 310 that may be of any suitable type. The master controller 302, may process the sensor signals 312 to determine one or more physical measurements of the fracking operation. For example, temperature sensors (e.g., thermocouple sensors) may measure the temperature of a variety of elements, such as the fracking fluid, the fracking site 100 ambient temperature, the temperature of individual ones of the engine(s) 208, transmissions 210, and/or pumps 212, or the like. As another example, the sensors 310 may include pressure sensors that may provide sensor signals 312 indicative of the fracking fluid inlet pressure, the fracking fluid outlet pressure, the fracking fluid pressure at the outlet of individual ones of the engine(s) 208, transmissions 210, and/or pumps 212, or the like. As yet another example, the sensors 310 may include density sensors, flow rate sensors, and/or fill level sensors that may provide sensor signals 312 indicative of the density, flow rate, and/or fill level of fracking fluid at any suitable location of the fracking site 100. The master controller 302 may use these sensor signals 302 in conjunction with other operating parameters to determine optimized operations at the fracking site 100.

In some cases, the master controller 302 may receive messages derived from sensor measurements, rather than directly from a sensor 310. For example, the master controller 302 may receive messages from one or more of trailers 120, engines 208, transmissions 210, and/or pumps 212, where the message may represent a state of the fracking operations. For example, the master controller 302 may receive, from a pump controller 324, an indication of the cavitation and/or a magnitude of the cavitation.

At block 410, the master controller 302 accesses one or more trailer models 314 corresponding to individual ones of the trailers 120 at the fracking site 100. The one or more trailer models 314 may be accessed from any suitable location, such as memory and/or storage associated with the master controller 302, such as the fracking datastore 328. These trailer model(s) 314 may provide an indication of the operations of the trailers 120 at the fracking site 100 and/or the operations of individual ones of the engine(s) 208, transmission(s) 210, and/or pumps 212 at the fracking site 100. For example, a particular trailer model 314 may indicate inefficiency of a particular engine 208 as a function of output power. Thus, these trailer model(s) 314 may provide an indication of output parameters of a particular equipment as a function of the control of input parameters. The trailer models 314 may be of any suitable type, such as any variety of multivariate regression, look-up table, fitting function, machine learning, and/or artificial intelligence models, such as neural network models. Other machine learning model(s) that may be generated and used as the one or more trailer model(s) 314 may include, for example, linear regression models, decision tree models, random forest models, Bayesian network models, any variety of heuristics (e.g., genetic algorithms, swarm algorithms, etc.), combinations thereof, or the like.

At block 412, the master controller 302 generates control signals 318 based at least in part on one or more of the desired operating conditions 308, the site configuration 304, the configuration of individual trailers 306, the one or more sensor signals 312, and the one or more trailer models 314. Generating the control signals 318, in some cases, may entail the master controller 302 determining operating conditions of individual trailers 120 and/or individual engines 208, individual transmissions 210, and/or individual pumps 212 at the fracking site 100 that would optimize the fracking operation according to one or more objectives. These, objectives may include, but are not limited to, reducing the cost of the fracking operation, reducing emissions from the fracking operation, reducing idle time during the fracking operation, reducing wear on fracking equipment during the fracking operations, increasing efficiency of the fracking operation, reducing an overall time of the fracking operation, and/or reducing the cost of ownership of the equipment used in the fracking operation.

The master controller 302 may optimize across the entirety of the equipment and the operations thereof at a fracking site 100 to meet one or more of the aforementioned objectives. The master controller 302 may use any suitable mechanism to optimize the fracking operations, such as any suitable heuristic mechanisms, or the like. In some cases, this optimization may be performed at a trailer 120 level. In other cases, this optimization may be performed at an individual engine 208, transmission 210, and/or pump 212 level. The master controller 302 may generate the individual control signals 318, to control the various equipment at the fracking site 100 to operate according to the optimized operation.

The master controller 302 may optimize the fracking operation using a variety of mechanisms, such as by using heuristic mechanisms, where the master controller 302 selects operating conditions of a trailer 120 and/or engines 208, transmissions 210, and/or pumps 212, and then refines its selections based at least in part on the factors for which it is optimizing. In this way, the master controller 302 may repeatedly refine its selection of operating conditions and may stop the refinements when a solution has sufficiently converged and no longer produces improvements above a threshold level, according to the objectives, with further refinement. The master controller 302, alternatively, may use analytic mechanisms to optimize to the one or more objectives. For example, the master controller 302 may combine trailer models 314 pertaining to engines 208, trailers 210, and/or pumps 212 and identify extrema (e.g., minima and/or maxima) of objectives within the operation space. For example, the master controller 302 may combine efficiency models, as particular trailer models 314, of the engine 208, the transmission 210, and the pump 212 to identify maxima therein for the purposes of maximizing efficiency of the trailer 120 with the engine 208, the transmission 210, and the pump 212. It should be understood that the aforementioned mechanisms are examples, and there may be any number of suitable mechanisms for optimizing the fracking operations according to one or more objectives. As discussed herein, the master controller 302 may, in some examples, generate control signals 318 to instruct a trailer 120 with an electric motor instead of an engine 208 and/or transmission 210.

At block 414, the master controller 302 sends the control signals 318 to one or more controllers 320, 322, 324, 326 associated with individual trailers 120. In some cases, the master controller 302 may generate the control signals 318 for trailer level control, rather than for individual engine 208, individual transmission 210, and/or individual pump 212 level control. In these cases, the control signals 318 may be sent by the master controller 302 to individual trailer controllers 326 of corresponding trailers 120, rather than the engine controllers 320, the transmission controllers 322, and/or the pump controllers 324 of respective corresponding engines 208, transmissions 210, and/or pumps 212. The control signals 318, in these cases, may indicate any suitable operating conditions at the trailer level, such as flow rate, discharge pressure, or the like from the trailer 120. The trailer controller 326 of a particular trailer 120 may receive the control signals 318, in these implementations, and cooperate with the engine controller 320, transmission controller 322, and/or pump controller 324 of the same trailer 120 to control the trailer 120 according to the received control signals 318. Thus, in this implementation, the control signals 318 may include trailer signals to control individual trailers 120 at the fracking site 100. In other cases, the master controller 302 generates control signals 318 for individual engine 208, individual transmission 210, and/or individual pump 212 level control. In these cases, the control signals 318 may be sent by the master controller 302 to individual engine controllers 320, individual transmission controllers 322, and/or individual pump controllers 324 of respective corresponding engines 208, transmissions 210, and/or pumps 212 at the fracking site 100.

In examples where trailers 120 include electric motors instead of an engine 208 and/or a transmission 210, the master controller 302 may instruct the trailer controller 326 with the control signals 318 to control the operations of the corresponding trailer 120. The trailer controller 326, in turn, may control the operations of the electric motor and pump 212 (and, optionally a transmission 210). For example, the master controller 302 may send control signals 318 to the trailer controller 326 of a particular trailer 120 with an electric motor, where the control signals 318 may correspond to a particular pressure, flow rate, and/or any other controllable operating characteristic. The trailer controller 326 may then control the electric motor and the pump 212 to operate to the operating characteristics corresponding to the received control signals 318. It should be noted that some of the operations of method 400 may be performed out of the order presented, with additional elements, and/or without some elements. Some of the operations of method 400 may further take place substantially concurrently and, therefore, may conclude in an order different from the order of operations shown above.

Figure 5:
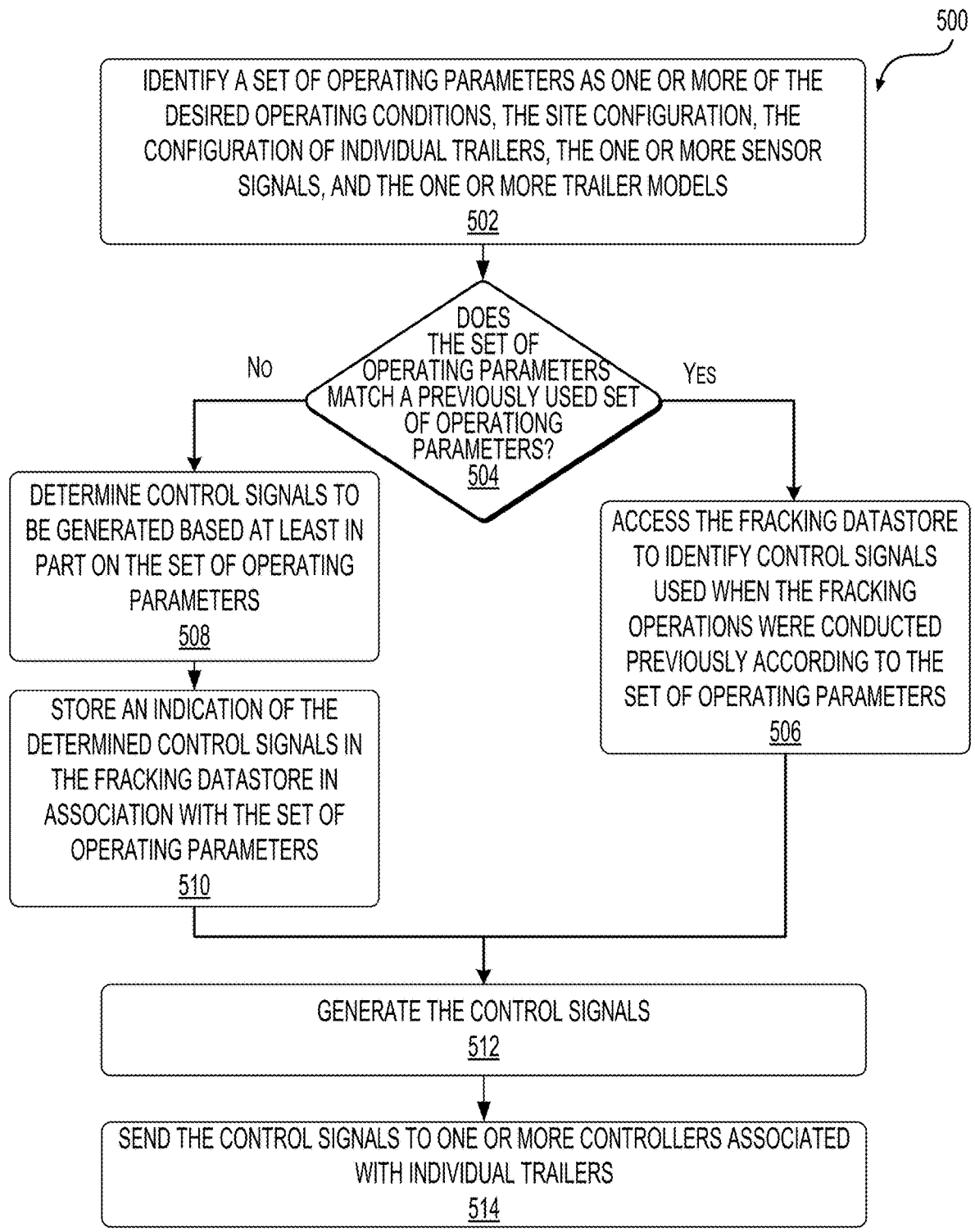
FIG. 5 is a flow diagram depicting an example method for automatically controlling a fracking operation, according to examples of the disclosure.

FIG. 5 is a flow diagram depicting an example method 500 for automatically controlling a fracking operation, according to examples of the disclosure. The processes of method 500 may be performed by the master controller 302, individually or in conjunction with one or more other components of fracking site 100 environment 300. The processes of method 500 may be performed by the master controller 302, individually or in conjunction with one or more other components of fracking site 100 and/or environment 300.

At block 502, the master controller 302 identifies a set of operating parameters as one or more of the desired operating conditions, the site configuration, the configuration of individual trailers, the one or more sensor signals, and/or the one or more trailer models. These operating parameters and the one or more trailer models 314 may be acquired and/or received by the master controller as described above in conjunction with FIG. 4.

At block 504, the master controller 302 determines if the set of operating parameters match a previously used set of operating parameters. This may be determined by the master controller 302 by accessing a repository of operating parameters used in the past, such as one stored in the fracking datastore 328. In some cases, the master controller 302 may determine that the set of operating parameters are a match to a previous set of operating parameters, if the current operating parameters and the previous operating parameters are substantially similar, even if the two are not exactly identical. If it is determined that the current operating parameters match a previous set of operating parameters (Step 504—Yes), then the method 500 proceeds to block 506, where the master controller 302 accesses the fracking datastore 328 to identify control signals 318 used when the fracking operations were conducted prior with the same or similar set of operating parameters. In some cases, the indications of control signals 318 may be stored in a dynamic manner, where those operating parameters that are used more frequently may be more granularly defined and stored along with their corresponding control signals 318, while less frequently used operating parameters may be less granularly defined in the fracking datastore 328.

If, at block 504, the master controller 302 determines that the set of operating parameters do not match a previous set of operating parameters (Step 504—No), then, at block 508, the master controller 302 determines control signals 318 to be generated based at least in part on the set of operating parameters. As described in conjunction for block 412 of FIG. 4, the master controller 302 may perform an optimization according to one or more objectives to arrive at an optimized fracking operation. The master controller 302 may then generate control signals 318 that allow individual equipment (e.g., trailers 120, engines 208, transmissions 210, and/or pumps 212) to operate in a manner that enables operations according to the optimized fracking operation.

At block 510, the master controller 302 stores an indication of the determined control signals in the fracking datastore 328 in association with the set of operating parameters. This allows the master controller 302 to leverage the optimization, as described in conjunction with block 506, if the same or similar operating parameters are used in the future. In some examples, the master controller 302 may store the indication of the control signals in a dynamic manner, where operating parameters that are used more frequently may be stored in a more precise manner relative to operating parameters that are less frequently used in fracking operations. Thus, regions of the operating space of a trailer 120 and/or a fracking site 100 that are more frequently used may be mapped with a greater degree of granularity and/or precision than regions of the operating space that are less frequently used. In this way, the more frequently used operating conditions may be precisely defined without expending a relatively high level of storage bandwidth and/or processing bandwidth on less frequently used regions of the operating space.

At block 512, regardless of whether the master controller 302 identified the required control signals 318 by accessing the fracking datastore 328 at block 506 or determined the required control signals 318 using the trailer models 314 at block 508, at block 512, the master controller 302 generates the control signals 318. After determining the control signals 318 to be generated, the master controller generates the control signals 318 as electrical waveforms, which may carry information instructing operations of the individual trailers 120, individual engines 208, individual transmissions 210, and/or individual pumps 212. As discussed herein, the master controller 302 may, in some examples, generate control signals 318 to instruct a trailer 120 with an electric motor instead of an engine 208 and/or transmission 210.

At block 514, the master controller 302 sends the control signals 318 to one or more controllers associated with individual trailers 120. In some cases, the control signals 318 may be generated for trailer level control, rather than for individual engine 208, individual transmission 210, and/or individual pump 212 level control. In these cases, the control signals 318 may be sent by the master controller 302 to individual trailer controllers 326 of corresponding trailers 120, rather than the engine controllers 320, the transmission controllers 322, and/or the pump controllers 324 of respective corresponding engines 208, transmissions 210, and/or pumps 212. The control signals 318, in these cases, may indicate any suitable operating conditions at the trailer level, such as flow rate, discharge pressure, or the like from the trailer 120. The trailer controller 326 of a particular trailer 120 may receive the control signals 318, in these implementations, and cooperate with the engine controller 320, transmission controller 322, and/or pump controller 324 of the same trailer 120 to control the trailer 120 according to the received control signals 318. Thus, in this implementation, the control signals 318 may include trailer signals to control individual trailers 120 at the fracking site 100. In other cases, the control signals 318 may be generated for individual engine 208, individual transmission 210, and/or individual pump 212 level control. In these cases, the control signals 318 may be sent by the master controller 302 to individual engine controllers 320, individual transmission controllers 322, and/or individual pump controllers 324 of respective corresponding engines 208, transmissions 210, and/or pumps 212 at the fracking site 100.

In examples where trailers 120 include electric motors instead of an engine 208 and/or a transmission 210, the master controller 302 may instruct the trailer controller 326 with the control signals 318 to control the operations of the corresponding trailer 120. The trailer controller 326, in turn, may control the operations of the electric motor and pump 212 (and, optionally a transmission 210). For example, the master controller 302 may send control signals 318 to the trailer controller 326 of a particular trailer 120 with an electric motor, where the control signals 318 may correspond to a particular pressure, flow rate, and/or any other controllable operating characteristic. The trailer controller 326 may then control the electric motor and the pump 212 to operate to the operating characteristics corresponding to the received control signals 318.

It should be understood that according to method 500, a fracking operation and/or a step within a fracking operation does not need to be re-optimized every time, if the operating parameters of that fracking operation and/or the step within the fracking operation are the same or similar to operating parameters to which the fracking operations and/or the step have been optimized to previously. This situation may arise whenever there are repeating steps at a particular fracking site 100. This situation may also arise if the same equipment is being used at more than one fracking site 100.

It should be noted that some of the operations of method 500 may be performed out of the order presented, with additional elements, and/or without some elements. Some of the operations of method 500 may further take place substantially concurrently and, therefore, may conclude in an order different from the order of operations shown above.

Figure 6:
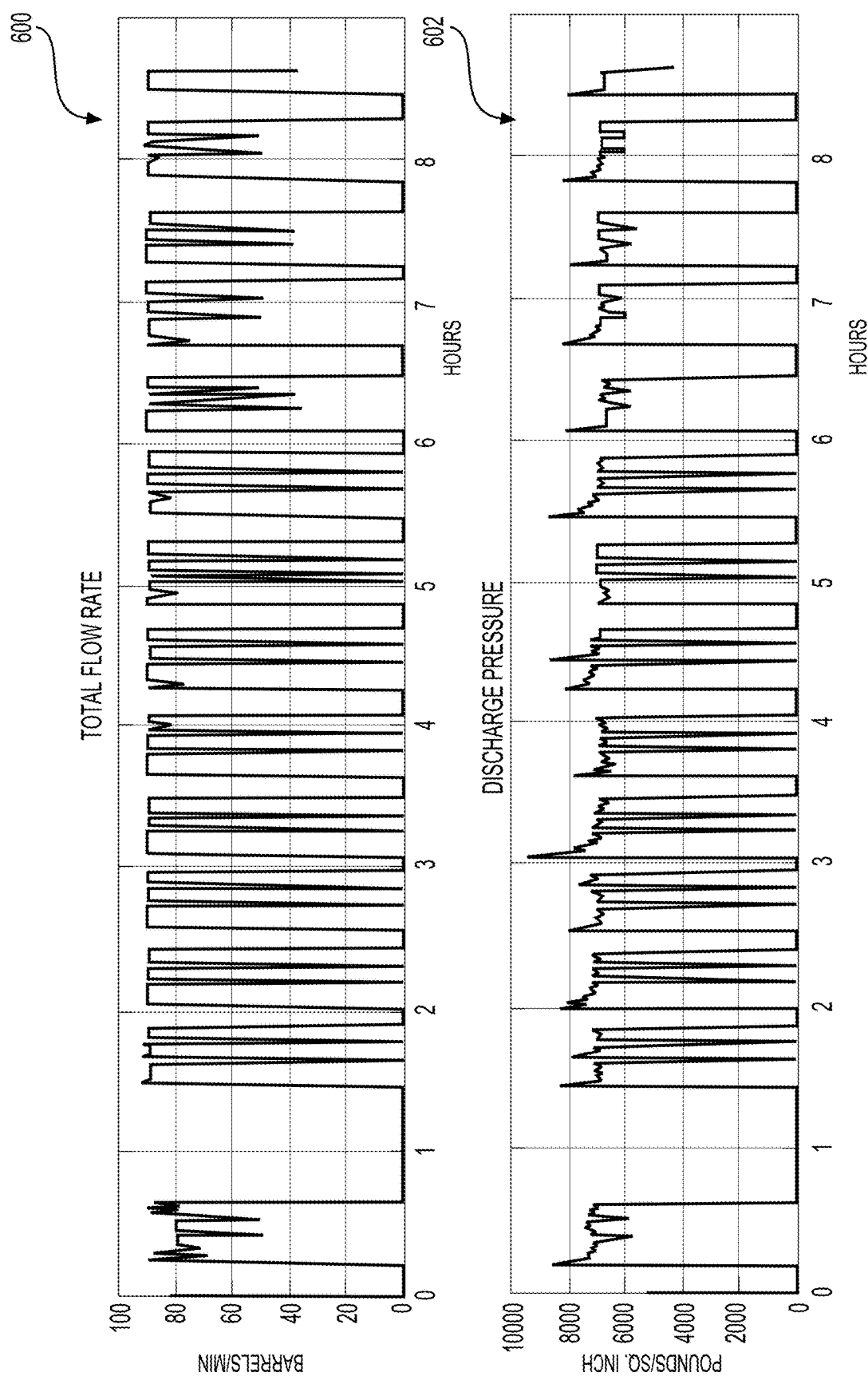
FIG. 6 are charts that depict a mechanism of fracking operation control of flow rate and discharge pressure, according to examples of the disclosure.

FIG. 6 are charts that depict a mechanism of fracking operation control of flow rate and discharge pressure, according to examples of the disclosure. As shown in FIG. 6, charts 600 and 602 show control signals to control total flow rate, as measured in barrels per minute, as a function of time and discharge pressure, as measured in pounds per square inch, as a function of time, respectively. These control signals 318 may be generated by the master controller 302 and provided to trailer controllers 326 to control the fracking operation at the trailer level. The trailer controllers 326, in turn may cooperate with the engine controller 320, the transmission controller 322, and/or the pump controller 324 to control the trailer's operation according to the control signals 318. In some cases, the trailer controllers may control an electric motor and pump 212 to achieve the controlled flow rate and/or discharge pressure.

Figure 7:
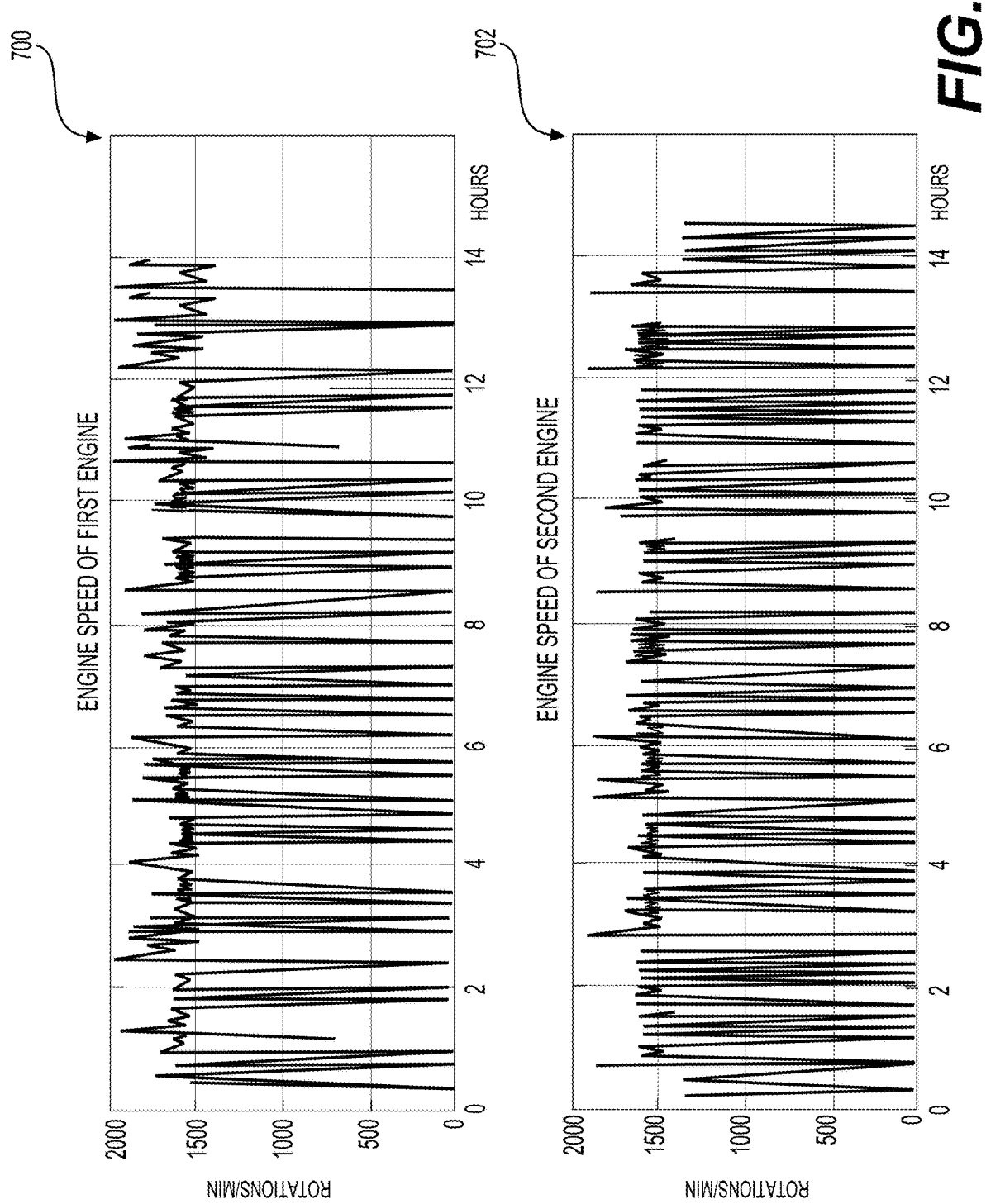
FIG. 7 are charts that depict a mechanism of fracking operation control of engine speed, according to examples of the disclosure.

FIG. 7 are charts that depict a mechanism of fracking operation control of engine speed, according to examples of the disclosure. As shown in FIG. 7, charts 700 and 702 show the engine speed, as measured in rotations per minute (RPM), of a first type of engine and an engine speed, as measured in RPM, of a second type of engine as a function of time, respectively. Both the control signals 318, as generated by the master controller 302.

Figure 8:
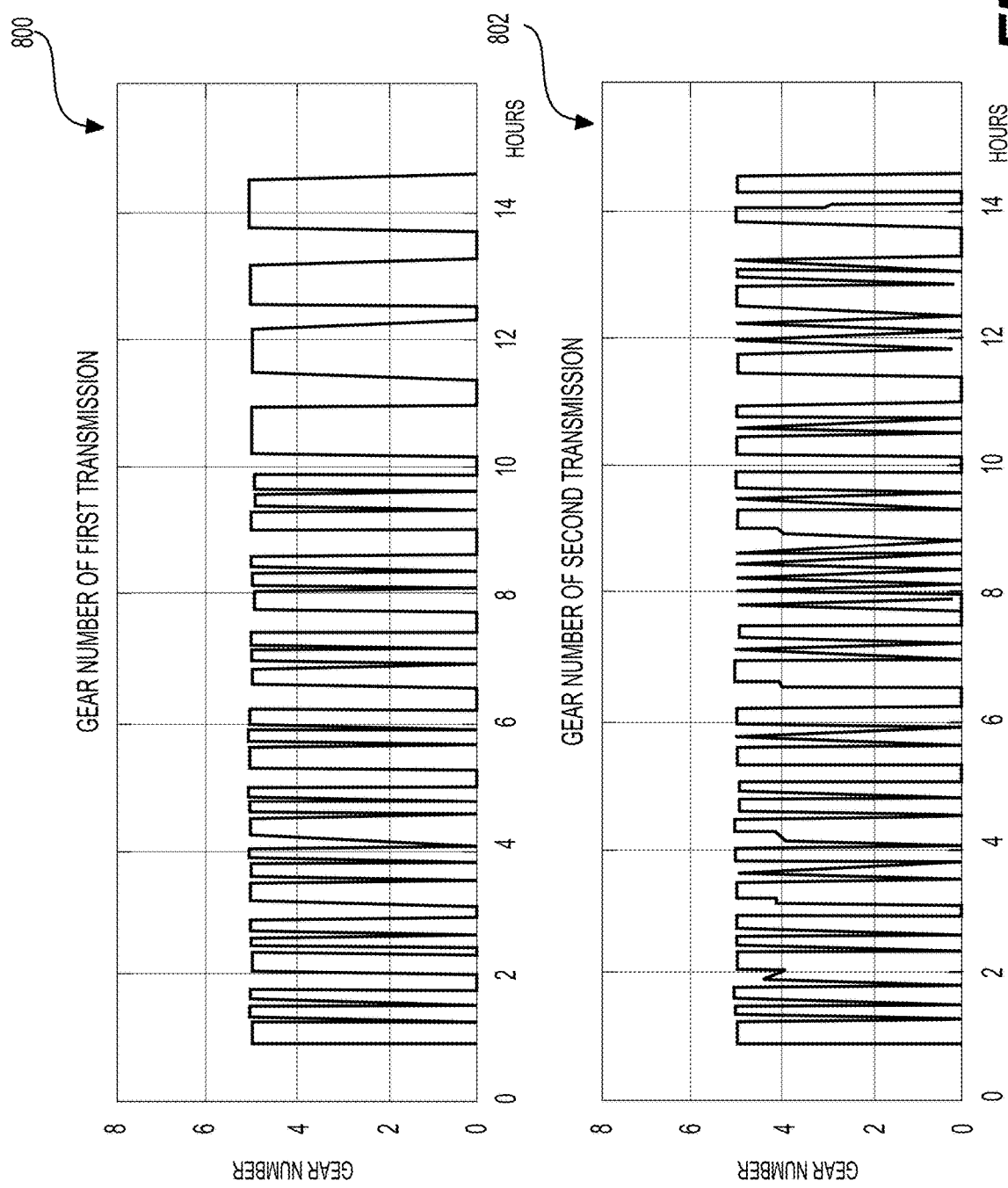
FIG. 8 are charts that depict a mechanism of fracking operation control of transmission gear, according to examples of the disclosure.

FIG. 8 are charts that depict a mechanism of fracking operation control of transmission gear, according to examples of the disclosure. As shown in FIG. 8, charts 800 and 802 show the gear selection, as a gear number, of a first transmission and a gear selection, as a gear number, of a second transmission as a function of time, respectively. Both the control signals 318 as generated by the master controller 302, as well as the actual controlled engine speed are shown.

Figure 9:
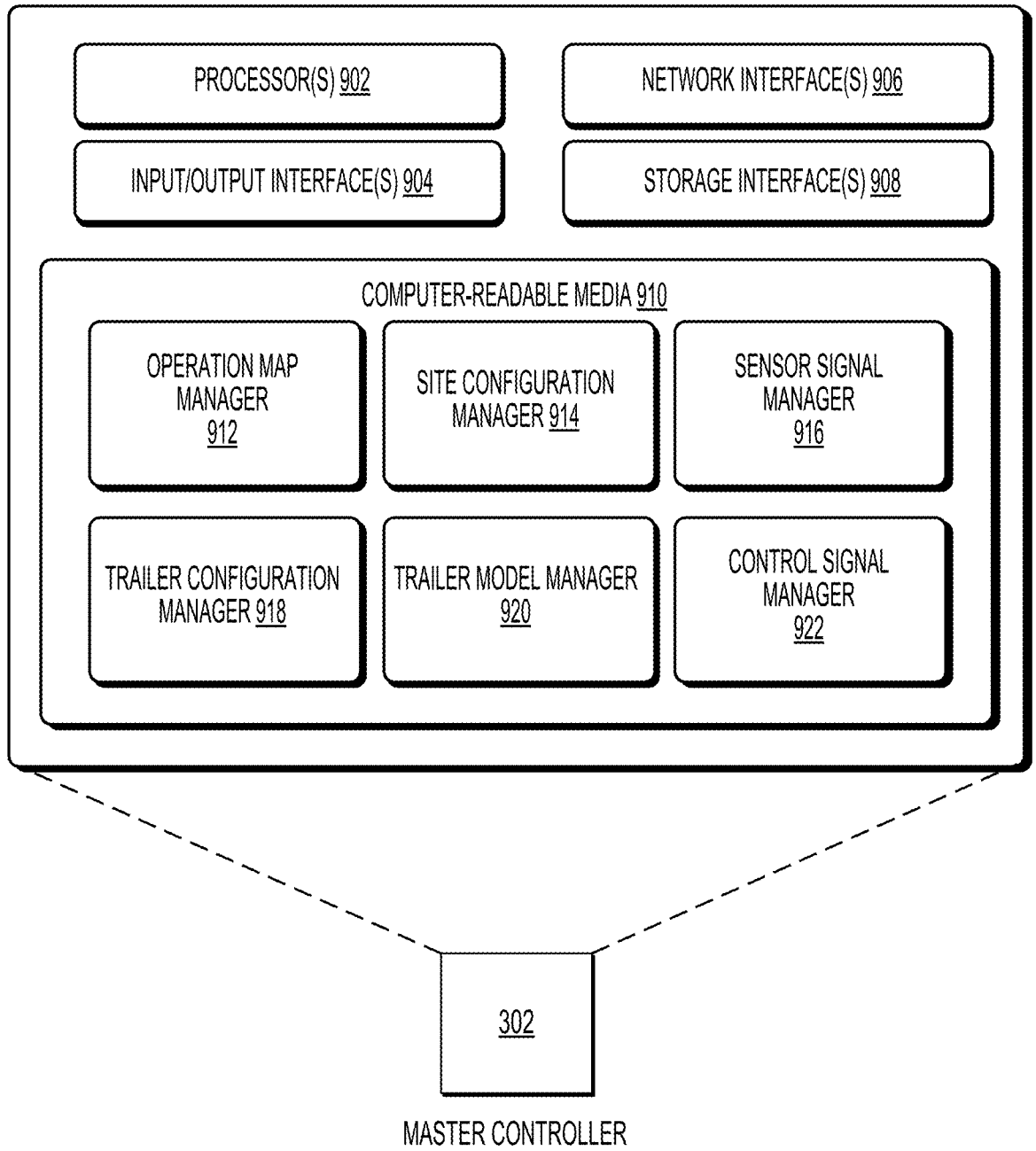
FIG. 9 is a block diagram of an example master controller that controls a fracking operation, according to examples of the disclosure.

FIG. 9 is a block diagram of an example master controller 302 that controls a fracking operation, according to examples of the disclosure. The descriptions of other controllers 320, 322, 324, 326 that may be included in the engines 208, transmissions 210, pumps 212, and/or trailers 120 may be similar to the descriptions of the master controller 302 herein. The master controller 302 includes one or more processor(s) 902, one or more input/output (I/O) interface(s) 904, one or more network interface(s) 906, one or more storage interface(s) 908, and computer-readable media 910.

In some implementations, the processors(s) 902 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 902 may possess its own local memory, which also may store program modules, program data, and/or one or more operating systems. The one or more processor(s) 902 may include one or more cores.

The one or more input/output (I/O) interface(s) 904 may enable the master controller 302 to detect interaction with an operator of master controller 302. For example, the operator may provide the master controller 302 with desired operating conditions 308. Thus, the I/O interface(s) 904 may include and/or enable the master controller 302 to receive and/or send information that is to be used to control the equipment at the fracking site 100.

The network interface(s) 906 may enable the master controller 302 to communicate via the one or more network(s). The network interface(s) 906 may include a combination of hardware, software, and/or firmware and may include software drivers for enabling any variety of protocol-based communications, and any variety of wireline and/or wireless ports/antennas. For example, the network interface(s) 906 may comprise one or more of WiFi, cellular radio, a wireless (e.g., IEEE 802.1x-based) interface, a Bluetooth® interface, and the like.

The storage interface(s) 908 may enable the processor(s) 902 to interface and exchange data with the computer-readable medium 910, as well as any storage device(s) external to the master controller 302, such as the fracking datastore 328. The storage interface(s) 908 may further enable access to removable media.

The computer-readable media 910 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 910 may be implemented as computer-readable storage media (CRSM), which may be any available physical media accessible by the processor(s) 902 to execute instructions stored on the memory 910. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information, and which can be accessed by the processor(s) 902. The computer-readable media 910 may have an operating system (OS) and/or a variety of suitable applications stored thereon. The OS, when executed by the processor(s) 902 may enable management of hardware and/or software resources of the master controller 302.

Several components such as instruction, datastores, and so forth may be stored within the computer-readable media 910 and configured to execute on the processor(s) 902. The computer readable media 910 may have stored thereon an operation map manager 912, a site configuration manager 914, a sensor signal manager 916, a trailer configuration manager 918, a trailer model manager 920, and a control signal manager 922. It will be appreciated that each of the components 912, 914, 916, 918, 920, 922 may have instructions stored thereon that when executed by the processor(s) 902 may enable various functions pertaining to automated control of fracking operations, as described herein.

The instructions stored in the operation map manager 912, when executed by the processor(s) 902, may configure the master controller 302 to receive various operating parameters, and in particular, the desired operating conditions 308. These desired operating conditions may be received from any suitable source, such as from an operator interacting directly with an HMI (e.g., mouse keyboard, display, etc.) associated with the master controller 302. Alternatively, the master controller 302 may receive the desired operating conditions by communicating with a client device used by an operator to indicate to the master controller 302 the desired operating conditions 308.

The instructions stored in the site configuration manager 914, when executed by the processor(s) 902, may configure the master controller 302 to receive information about the fracking site 100, such as how many trailers 120 are at the fracking site 100. The processor(s) 902 may receive the site configuration via HMIs and/or from communicating with a client device. Alternatively, the master controller 302 may automatically receive messages and/or engage in handshaking protocols with individual trailer controllers 326 and/or individual engine controllers 320, individual transmission controllers 322, and/or individual pump controllers 324 to determine and/or catalog the various equipment to be controlled at the fracking site 100.

The instructions stored in the sensor signal manager 916, when executed by the processor(s) 902, may configure the master controller 302 to receive various sensor signals 312, such as pressure sensor signal(s), temperature sensor signal(s), or the like, and determine physical parameters therefrom. For example, the master controller 302 may be configured to determine the pressure in the pipes 104, the wellhead 102, and/or at the outlet of any of the pumps 212. Similarly, the master controller 302 may be configured to determine the temperature within the pipes 104, the engines 208, the transmissions 210, the pumps 212, and/or the ambient. There may be any suitable number and/or types of sensors, such as flow meters, density sensors, or the like, that may provide sensor signals 312 to the master controller 302 and the master controller 302 is able to determine physical parameters based at least in part on those sensor signals. The instructions stored in the sensor signal manager 916, when executed by the processors 902, may further enable receiving sensor signal(s) 312 and/or indications from one or more sensors from other controller(s) 320, 322, 324. For example, the master controller may be configured to receive, from one or more pump controllers 324, an indication and/or magnitude of cavitation experienced during the fracking operation.

The instructions stored in the trailer configuration manager 918, when executed by the processor(s) 902, may configure the master controller 302 to identify information about individual ones of the engines 208, transmissions 210, and/or pumps 212 as mounted on each of the trailers 120 at the fracking site 100. The processor(s) 902 may receive the trailer configuration 306 via HMIs, from communicating with a client device, and/or by communicating directly with individual trailer controllers 326 and/or individual engine controllers 320, individual transmission controllers 322, and/or individual pump controllers 324 to determine and/or catalog the various equipment to be controlled on each trailer 120.

The instructions stored in the trailer model manager 920, when executed by the processor(s) 902, may configure the master controller 302 to receive and/or retrieve one or more trailer models 314. The trailer models 314 may model various aspects of the equipment on individual ones of the trailers 120 at the fracking site 100. The one or more trailer models 314 may be accessed from any suitable location, such as computer-readable media 910 and/or storage associated with the master controller 302, such as the fracking datastore 328. These trailer model(s) 314 may provide an indication of the operations of the trailers 120 at the fracking site 100 and/or the operations of individual ones of the engine(s) 208, transmission(s) 210, and/or pumps 212 at the fracking site 100. These trailer model(s) 314 may provide an indication of output parameters of a particular equipment as a function of the control of input parameters.

The instructions stored in the control signal manager 922, when executed by the processor(s) 902, may configure the master controller 302 to generate and send control signals to one or more equipment at the fracking site 100. In some cases, the master controller 302 may send individual control signals 318 to individual engines 208, transmissions 210, and/or pumps 212 at the fracking site 100. In other cases, the master controller 302 may send control signals 318 to a trailer controller that then controls the individual engine 208, transmission 210, and/or pump of the trailer 120.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented or may not necessarily need to be performed at all, according to some embodiments of the disclosure.

Computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

INDUSTRIAL APPLICABILITY

The present disclosure describes systems and methods for automated fracking operations. Fracking provides several advantages, such as extraction of oil and gas from various geologic formations, such as various rocks, and in a horizontal manner. Fracking can extend the lifetimes of existing oil wells that may otherwise be nearing the end of their lifetimes. The systems and methods disclosed herein allow for automatically controlling fracking operations based at least in part on desired operating conditions and a variety of operating parameters.

By the fracking operation control systems and mechanisms disclosed herein, the viability of fracking operations between various human operators can be eliminated and the fracking equipment at a fracking site 100 may be operated in an optimized, or at least a more optimized, manner. The mechanism disclosed herein allows for determination of the operating control of a disparate set of equipment (e.g., different makes, models, power specifications, load specifications, etc.) to operate the overall fracking operation to optimize according to any desired set of outcomes. Thus, according to the disclosure, a disparate set of fracking equipment can be used together in an efficient and low-cost manner. Additionally, by using trailer models associated with different equipment at the fracking site, a more efficient fracking operation can be derived compared to human controllers, thereby making the fracking operation lower-cost, less time consuming, and more environmentally friendly.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein.

What is claimed is:

1. A system, comprising:
   a master controller including one or more processors; and
   one or more computer-readable media storing computer-executable instructions that, when executed by the master controller, cause the master controller to:
   determine a site configuration of a hydraulic fracturing (fracking) site having a first trailer and a second trailer;
   determine a first trailer configuration of the first trailer, the first trailer including a first controller;
   determine a second trailer configuration of the second trailer, the second trailer including a second controller;
   identify a first trailer model associate with the first trailer, wherein the first trailer model is trained using historical operations of the first trailer;
   identify a second trailer model associated with the second trailer, wherein the second trailer model is trained using historical operations of the second trailer;
   receive an indication of desired operating conditions;
   generate, using the first trailer model and based at least in part on the site configuration, the first trailer configuration, and the desired operating conditions, a first control signal;
   send the first control signal to the first controller, the first control signal being executable by the first controller to control the first trailer;
   generate, using the second trailer model and based at least in part on the site configuration, the second trailer configuration, and the desired operating conditions, a second control signal; and
   send the second control signal to the second controller, the second control signal being executable by the second controller to control the second trailer.

2. The system of claim 1, wherein to generate the first control signal, the computer-executable instructions further cause the master controller to:
   determine, by accessing a fracking datastore, that the site configuration, the trailer configuration, and the desired operating conditions match a previously used set of operating parameters;
   determine a previously used first control signal corresponding to the previously used set of operating parameters; and
   determine the first control signal is to match the previously used first control signal.

3. The system of claim 1, wherein to generate the first control signal, the computer-executable instructions further cause the master controller to:
   determine, by accessing a fracking datastore, that the site configuration, the trailer configuration, and the desired operating conditions are unique compared to previously used sets of operating parameters; and
   determine, according to one or more objectives and based at least in part on the site configuration, the trailer configuration, the desired operating conditions, and the one or more trailer models, the first control signal.

4. The system of claim 3, wherein the one or more objectives comprise at least one of: (i) reducing a cost of the fracking operation, (ii) reducing emissions from the fracking operation, (iii) reducing idle time during the fracking operation, (iv) reducing wear on fracking equipment during the fracking operations, (v) increasing efficiency of the fracking operation, (vi) reducing an overall time of the fracking operation, and (vii) reducing a cost of ownership of the equipment used in the fracking operation.

5. The system of claim 1, wherein the computer-executable instructions further cause the master controller to:
   receive one or more sensor signals, wherein the first control signal is further based at least in part on the one or more sensor signals.

6. The system of claim 1, wherein to generate the first control signal, the computer-executable instructions further cause the master controller to:
   determine an engine control signal; and
   determine a transmission control signal, wherein to send the first control signal to the first controller, the computer-executable instructions further cause the master controller to send the engine control signal to an engine controller and send the transmission control signal to a transmission controller.

7. The system of claim 6, wherein to generate the first control signal, the computer-executable instructions further cause the master controller to:
   determine a pump control signal, and wherein to send the first control signal to the first controller, the computer-executable instructions further cause the master controller to send the pump control signal to a pump controller.

8. A method, comprising:
   determining, by a master controller comprising one or more processors, a site configuration of a hydraulic fracturing (fracking) site having a first trailer and a second trailer;
   determining, by the master controller, a first trailer configuration of the first trailer, the first trailer including a first controller;
   determining, by the master controller, a second trailer configuration of the second trailer, the second trailer including a second controller;
   identifying, by the master controller, a first trailer model associate with the first trailer, wherein the first trailer model is trained using historical operations of the first trailer;
   identifying, by the master controller, a second trailer model associated with the second trailer, wherein the second trailer model is trained using historical operations of the second trailer;
   receiving, by the master controller, an indication of desired operating conditions;
   determining, by the master controller by accessing a fracking datastore, that the site configuration, the trailer configuration, and the desired operating conditions are unique compared to previously used sets of operating parameters;
   determining, by the master controller using the first trailer model and based at least in part on the site configuration, the first trailer configuration, and the desired operating conditions, a first control signal;

sending the first control signal to the first controller, the first control signal executable by the first controller to control the first trailer;

determining, by the master controller using the second trailer model and based at least in part on the site configuration, the second trailer configuration, and the desired operating conditions, a second control signal; and sending the second control signal to the second controller, the second control signal being executable by the second controller to control the second trailer.

9. The method of claim 8, further comprising:

determine, according to one or more objectives and based at in part on the site configuration, the first trailer configuration, the desired operating conditions, and the first trailer model, the fracking operations as an optimized fracking operation, wherein the first control signal is based at least in part on the optimized fracking operation.

10. The method of claim 9, wherein the one or more objectives comprise at least one of: (i) reducing a cost of the fracking operation, (ii) reducing emissions from the fracking operation, (iii) reducing idle time during the fracking operation, (iv) reducing wear on fracking equipment during the fracking operations, (v) increasing efficiency of the fracking operation, (vi) reducing an overall time of the fracking operation, and (vii) reducing a cost of ownership of the equipment used in the fracking operation.

11. The method of claim 8, further comprising:

receiving, from a pump controller, an indication of cavitation;

generating, by the master controller and based at least in part on the indication of cavitation, a third control signal; and sending, to the pump controller, the third control signal.

12. The method of claim 8, further comprising:

determining, by the master controller and based at least in part on the site configuration, the trailer configuration, the desired operating conditions, and a third trailer model, a third control signal; and sending the third control signal to a third controller associated with a third trailer.

13. The method of claim 8, further comprising:

receiving, by the master controller, a second indication of second desired operating conditions;

determining, by the master controller by accessing the fracking datastore, that the site configuration, the first trailer configuration, and the second desired operating conditions match a previously used set of operating parameters;

determining a previously used control signal corresponding to the previously used set of operating parameters;

generating a third control signal as the previously used control signal; and sending the third control signal to the first trailer.

14. The method of claim 8, further comprising:

receiving one or more sensor signals, wherein the first control signal is further based at least in part on the one or more sensor signals.

15. A system, comprising:

a master controller including one or more processors, the master controller being operably connected to a first controller associated with a first trailer and a second controller associated with a second trailer via a network; and one or more computer-readable media storing computer-executable instructions that, when executed by the master controller, cause the master controller to:

determine a site configuration of a hydraulic fracturing (fracking) site at which the first trailer and the second trailer are disposed;

receive an indication of desired fracking fluid discharge pressure;

providing the site configuration and the desired fracking fluid discharge pressure to a first trailer model associated with the first trailer;

providing the site configuration and the desired fracking fluid discharge pressure to a second trailer model associated with the second trailer;

determine, using the first trailer model and based at least in part on the site configuration and the desired fracking fluid discharge pressure, a first control signal associated with the first trailer;

determine, using the second trailer model and based at least in part on the site configuration and the desired fracking fluid discharge pressure, a second control signal associated with the second trailer;

send the first control signal to the first controller via the network, the first control signal being used by the first controller to operate the first trailer; and send the second control signal to the second controller via the network, the second control signal being used by the second controller to operate the second trailer.

16. The system of claim 15, wherein to determine the first control signal, the computer-executable instructions further cause the master controller to:

determine a trailer configuration of the first trailer, wherein the first control signal is further based at least in part on the trailer configuration.

17. The system of claim 15, wherein to determine the first control signal, the computer-executable instructions further cause the master controller to:

determine, by accessing a fracking datastore, that the site configuration, and the desired operating conditions are unique compared to previously used sets of operating parameters; and determine, according to one or more objectives and based at least in part on the site configuration, the desired operating conditions, and the one or more trailer models, the fracking operations, wherein the first control signal is based at least in part on the fracking operation.

18. The system of claim 15, wherein the computer-executable instructions further cause the master controller to:

receive one or more sensor signals, wherein the first control signal is further based at least in part on the one or more sensor signals.

19. The system of claim 15, wherein the computer-executable instructions further cause the master controller to:

receive a second indication of second desired operating conditions;

determine, by accessing a fracking datastore, that the site configuration and the second desired operating conditions match a previously used set of operating parameters;

determine a first previously used control signal corresponding to the previously used set of operating parameters and the first trailer;

determine a second previously used control signal corresponding to the previously used set of operating parameters and the first trailer;

determine a third control signal corresponding to the first trailer as the first previously used control signal;
determine a fourth control signal corresponding to the second trailer as the second previously used control signal;
send the third control signal to the first trailer; and
send the fourth control signal to the second trailer.

20. The system of claim 15, wherein the first trailer model is based at least in part on historical operational data of the first trailer.

* * * * *